US012000660B1

(12) United States Patent
Stiesdal (10) Patent No.: US 12,000,660 B1
(45) Date of Patent: Jun. 4, 2024

(54) THERMAL ENERGY STORAGE SYSTEM WITH A SPRAY OF PHASE CHANGE MATERIAL AND METHOD OF ITS OPERATION

(71) Applicant: Stiesdal Storage A/S, Give (DK)

(72) Inventor: Henrik Stiesdal, Odense C (DK)

(73) Assignee: Stiesdal Storage A/S, Give (DK)

(*) Notice: Subject to any disclaimer, the term of this patent is extended or adjusted under 35 U.S.C. 154(b) by 0 days.

(21) Appl. No.: 18/286,850

(22) PCT Filed: Mar. 30, 2022

(86) PCT No.: PCT/DK2022/050068
§ 371 (c)(1),
(2) Date: Oct. 13, 2023

(87) PCT Pub. No.: WO2022/218486
PCT Pub. Date: Oct. 20, 2022

(30) Foreign Application Priority Data

Apr. 14, 2021 (DK) .......................... PA 2021 00370

(51) Int. Cl.
*F28D 20/02* (2006.01)
*F28D 20/00* (2006.01)

(52) U.S. Cl.
CPC .... *F28D 20/025* (2013.01); *F28D 2020/0082* (2013.01)

(58) Field of Classification Search
CPC ........... F28D 20/025; F28D 2020/0082; F28D 20/0056; F25B 11/02
(Continued)

(56) References Cited

U.S. PATENT DOCUMENTS 8,966,902 B2 * 3/2015 Stiesdal .................. F28D 17/04
60/659
8,991,183 B2 * 3/2015 Stiesdal .................... F02C 6/14
60/659

(Continued)

FOREIGN PATENT DOCUMENTS

WO 2009044139 A2 4/2009
WO 2012168472 A2 12/2012
(Continued)

OTHER PUBLICATIONS

Guedez R. et al., "Techno-economic Performance Evaluation of Solar Tower Plants with Integrated Multi-layered PCM Thermocline Thermal Energy Storage—A Comparative Study to Conventional Two-tank Storage Systems," SolarPACES 2015: International Conference on Concentrating Solar Power and Chemical Energy Systems: Cape Town, South Africa Oct. 13-16, 2015, AIP Conference Proceedings 1734:070012-1-070012-9.

*Primary Examiner* — Jon T. Schermerhorn, Jr.
(74) *Attorney, Agent, or Firm* — Elevated IP, LLC (57) ABSTRACT

An energy storage system comprises a hot thermal energy storage medium and a cold thermal energy storage medium, which are interconnected in a thermodynamic gas flow circuit with gas as a working fluid. An energy converter with a motor/generator system is functionally connected to a compressor/expander system for converting between electrical energy and thermal energy of the gaseous working fluid in the thermodynamic fluid circuit. A latent TES medium is thermally connected to the thermodynamic circuit for providing a lower limit for the temperature in the cold TES medium. Specifically, the latent TES medium is liquid, typically water, which is sprayed as droplets into a tank through which the gaseous working fluid flows at (Continued)

subzero temperatures to produce snow in order to efficiently heat the gas to the freezing point or above.

11 Claims, 4 Drawing Sheets

(58) Field of Classification Search
USPC .................................................... 165/104.17
See application file for complete search history.

(56) References Cited

U.S. PATENT DOCUMENTS

| | | |
|---|---|---|
| 9,841,243 B2 | 12/2017 | Llena et al. |
| 10,294,824 B2 * | 5/2019 | Sanz ........................ F28D 20/02 |
| 11,156,385 B2 * | 10/2021 | Laughlin .................. F24S 60/10 |
| 11,352,951 B2 * | 6/2022 | Apte .......................... F02C 6/14 |
| 11,761,336 B2 * | 9/2023 | Laughlin ................... F01D 1/02 |
| | | 60/659 |
| 11,940,226 B2 * | 3/2024 | Stiesdal .................... F01K 3/12 |
| 2010/0301614 A1 | 12/2010 | Ruer |
| 2011/0016858 A1 * | 1/2011 | Gaiser ..................... F01N 3/105 |
| | | 165/10 |
| 2014/0352295 A1 | 12/2014 | Reznik et al. |
| 2016/0298495 A1 | 10/2016 | Laughlin |
| 2017/0226900 A1 | 8/2017 | Sanz et al. |

FOREIGN PATENT DOCUMENTS

| | | |
|---|---|---|
| WO | 2013064524 A1 | 5/2013 |
| WO | 2013164563 A1 | 11/2013 |
| WO | 2014036476 A2 | 3/2014 |

* cited by examiner

THERMAL ENERGY STORAGE SYSTEM WITH A SPRAY OF PHASE CHANGE MATERIAL AND METHOD OF ITS OPERATION

CROSS-REFERENCE TO RELATED APPLICATIONS

This application is a 371 national stage application of International Patent Application No. PCT/DK2022/050068, filed Mar. 30, 2022, which claims the benefit of and priority to Danish Application No. PA 2021 00370, filed Apr. 14, 2021, each of which is hereby incorporated by reference in its entirety.

FIELD OF THE INVENTION

The present invention relates to energy storage by conversion between electrical and thermal energy. In particular, it relates to a system and method for an energy storage system with a thermodynamic circuit.

BACKGROUND OF THE INVENTION

Sustainable electricity production by wind and solar power suffers from the fact that electricity is not necessarily demanded at the time of production and not necessarily available at the time of demand. Accordingly, various energy storage facilities have been proposed, where the electrical energy is transformed into heat and stored until there is a demand for transforming it back into electricity.

International patent application WO2009/044139 discloses a system comprising a first thermal energy storage (TES) container and a second TES container at a lower temperature, which are interconnected through a compressor/expander arrangement for increasing or decreasing the temperature in the first TEC container during charging or discharging of the system, respectively. When there is surplus electricity, a compressor is driven by an electrical engine, increasing the temperature of gas by compression, which is then used to heat a TES medium in the form of a bed of gravel in the first TES container. When there is a demand for electricity, the compressed hot gas is released from the first TES container through an expander which drives an electrical generator for recovering the electrical energy.

During charging and discharging processes, a thermal front between hot and cold regions moves through the TES container from one end towards the other due to the gradual temperature changes in the TES container. During such movements of the thermal front, especially when the charging/discharging process is repeated, the temperature gradient tends to flatten between the two ends of the storage container, which is called thermocline degradation. Thermocline degradation is an effect of the temperature transition zone, also called thermocline zone or thermocline region, becoming wider. Thermocline degradation is not wanted because it decreases the overall efficiency of the system. Various methods have been proposed for counteracting such thermocline degradation by steepening the gradient and reducing the width of the thermocline zone.

The system of WO2009/044139 implies another problem when applied in practice, namely the fact that the specific heat capacity for the gravel decreases with temperature. Especially, for sub-zero temperature, not much thermal energy can be exchanged with the gravel. This implies that the low temperature range is not used to an extent that optimizes the efficiency, which depends on the temperature difference between the warm and the cold TES medium. In order to balance the energy storage, this also implies that the cold storage container would need more gravel than the hot storage container. When having in mind that costs for energy storage systems are sensitive to container sizes, this appears not optimum.

Alternative systems use phase change materials (PCM) in TES systems, which control the temperature at one end or both ends of the TES containers. An advantage of such systems is a better control of the thermocline.

Use of PCM is discusses and illustrated in the article, "Techno-economic Performance Evaluation of Solar Tower Plants with Integrated Multi-layered PCM Thermocline Thermal Energy Storage—A Comparative Study to Conventional Two-tank Storage Systems." by Guedez et al., presented at SolarPACES 2015, AIP Conf. Proc. 1734, 070012-1-070012-9; doi: 10.1063/1.4949159 and published in AIP Publishing. 978-0-7354-1386-3.

Examples of PCM in TES containers are disclosed in U.S. Pat. No. 9,841,243, where the PCM is provided in one end, but preferably in both ends, of the TES container, which has a sensitive TES medium in the middle. In this disclosure, theoretical data are presented, which show that combinations of latent and sensitive TES systems have a storage capability more than twice the capability of sensitive heat systems or latent heat systems, thus, favoring combinations of sensible and latent TES storage.

Various examples of multilayer PCM and its influence on the thermocline are discussed in US2017/226900. As a PCM, paraffin is proposed with a melting temperature of 130° C. In order to prevent the paraffin from melting and solidifying into a solid mass, which would prevent the gas from traversing the PCM, the paraffin is encapsulated and provided as a granular material.

However, this leads to a discussion of a general problem related to encapsulated particulate PCM. If the granules are too small, the PCM implies high costs, and the volume of the PCM relative to the volume of the heat transferring encapsulation becomes too small for practical large-scale applications. On the other hand, if the granules are too large, the thermal transfer into the PCM material is not adequate, which also poses difficulties with respect to practical applications, especially when the criteria include commercial aspects, such as costs for construction and maintenance as well as long-term profitability.

WO2014/036476 discloses combinations of sensible TES containers and latent TES containers, for example an ice slurry container. In particular, it discloses a thermodynamic circuit comprising a sensible TES container with granules for increased heat capacity and a latent heat container and a two-phase working fluid flowing serially through these containers, the working fluid being condensed and vaporized depending on the position in the circuit. The two-phase working fluid undergoes condensation at ambient temperature while exchanging energy with the surroundings. When the working medium is in the liquid phase, it is pumped by a pump between the sensible and the latent TES container, the direction of pumping dependent on whether the process is for charging or discharging. On the opposite side of the TES containers, relative to the position of the pump in the circuit, the working fluid is in the gas phase and flowing through a compressor/expander for receiving or delivering energy, respectively. Also disclosed is an embodiment in FIG. 14, which in a discharge mode has a latent TES container downstream of an expander and upstream of a pump which in turn is upstream of a sensible TES container.

Downstream of the sensible TES container is a heat exchanger system for heat exchange with ambient temperature. Accordingly, the temperature range of the sensible TES container is between ambient temperature Ta and a colder temperature Tc. It also discloses a hot storage circuit where the latent heat storage is used upstream of the sensible heat storage during charging, where the latent TES container is between the compressor and the sensible heat storage. The examples are primarily designed for heat exchange with the environment and temperature variations between ambient temperature and working fluid having a temperature varying between ambient temperature and a lower or higher temperature. Although, a large number of variations are disclosed, these do not have the flexibility of thermodynamic gas circuits with two sensible TES containers.

Combinations of sensible TES containers for cooling a cooling chamber to cryogenic temperatures for superconductors is disclosed in WO2013/164563A1. The circuit is extracting heat from the cooling chamber both during charging and discharging periods and, thus, extracts thermal energy at all times and does not transfer and store thermal energy in the cooling chamber. In general, there is still a need for improvement with respect to optimization of energy storage systems.

DESCRIPTION/SUMMARY OF THE INVENTION

It is therefore an objective of the invention to provide an improvement in the art. In particular, it is an objective to provide a thermal energy storage (TES) system and a method of operating it, which optimizes the system not only with respect to thermocline control, where the temperature gradient in the thermocline zone is kept steep, but also with respect to general efficiency and cost optimization. This objective and further advantages are achieved with a system and method as described below and in the claims.

In simple term, the invention provides a method of operating an energy storage system. The system comprises a hot thermal energy storage medium and a cold thermal energy storage medium, which are interconnected in a thermodynamic circuit with gas as a working fluid. An energy converter with a motor/generator system is functionally connected to a compressor/expander system for converting between electrical energy and thermal energy of the working fluid in the thermodynamic fluid circuit. The cold part of the TES system comprises a combination of a sensible TES medium and a latent TES medium, the latter being thermally connected to the thermodynamic circuit for providing a lower limit for the temperature in the cold sensible TES medium. Specifically, the latent TES medium is a liquid, typically water, which is sprayed as an atomized spray into a latent TES container through which the gaseous working medium flows at subzero temperatures to freeze the droplets to miniscule ice crystals, which efficiently heats the gaseous working fluid to or above the freezing point of the latent TES medium, for example 0° C. in the case of the latent TES medium being water.

The term sensible TES medium is used as customary in the technical field for TES media that are not changing phase during charging and discharging. In contrast thereto, the term latent TES medium is used as customary in the technical field for TES media that are changing phase during charging and discharging.

By providing such transfer of heat between the gaseous working fluid and the TES medium, a number of advantages are achieved:

- the temperature of the gaseous working fluid, prior to it receiving thermal energy from the cold TES medium, can be kept at a controlled predetermined temperature level, such as at zero-level, which is above the temperature of the gaseous working fluid at the expander outlet;
- energy can be stored at low temperature with high efficiency without the requirements of relatively large quantities of gravel in the cold TES container;
- the thermocline is controlled, and flattening of the gradient is counteracted, implying high efficiency of the thermodynamic circuit;
- the transfer of thermal energy to the spray to create snow is more efficient than with a stationary PCM because of the flow dynamics, small surface area of the droplets, and because there is no wall between the gaseous working fluid and the latent TES medium implying an almost instant temperature change of the gas;
- the latent TES container is suitable as a simple selectable add-on feature during the design phase of the TES system, making design with or without PCM easier than incorporation of the PCM in sensible TES containers;
- the PCM system is suitable as a retrofit addition for already existing TES systems.

As it appears from the above, the proposed configuration has a number of benefits. Details of the system are explained in the following.

In the TES system with the thermodynamic circuit, a gaseous working fluid is used, for example dried air. Throughout the entire thermodynamic gas flow circuit, the working fluid remains in the gas phase and does not change into liquid phase, which is why the term gaseous working fluid is used throughout herein.

A first TES container is provided, for example a first sensible TES container, which is in the hot part of the thermodynamic circuit. It contains a first TES medium as a hot storage medium. The first TES medium is in thermal connection with the gas flow circuit along a first gas flow path for exchange of thermal energy with the gaseous working fluid, wherein the first gas flow path is part of the gas flow circuit.

For example, the first TES medium is thermally connected to the gaseous working fluid in the first gas flow path by an intermediate fluid circuit, which during circulation transfers thermal energy between the TES medium and the gaseous working fluid. Alternatively, the first gas flow path is through the first TES medium, for example having exchange of thermal energy between the gaseous working fluid and the first TES medium by contact when the gaseous working fluid passes through the TES medium.

A second gas flow path through the second TES medium is provided as part of the gas flow circuit for exchange of thermal energy between the gaseous working fluid and the second TES medium.

In order for the gaseous working fluid to flow through the TES medium, it is advantageously gas permeable. For example, the TES medium is gravel, such as granite gravel or other types of stone material. Such materials are available at low costs and commonly used in TES systems. Also, the heat transfer from the gaseous working fluid to the gravel is efficient, especially if the gravel has a particle size of less than 10 mm. Although, in principle, the gaseous working fluid can also flow in tubes through the TES medium, making it possible to use compact or liquid TES media, this is often not preferred due to the lower thermal transfer efficiency.

For input and extraction of electrical energy, an energy converter is inserted into the circuit. On the one hand, it converts electrical energy to thermal energy that is added to the gaseous working fluid in the thermodynamic fluid circuit during charging and, on the other hand, converts thermal energy to electrical energy during discharging. For this, the energy converter comprises an electrical motor/generator system with a motor and a generator, and comprises a compressor/expander system with a compressor and an expander. The electrical motor of the motor/generator system is used for driving the compressor, for example turbo compressor, of the compressor/expander system for adding energy to the circuit by compressing, advantageously adiabatically compressing, the gaseous working fluid in the charging phase and thereby increasing the temperature of the gas. The generator is used for producing electricity in the discharge phase, where the generator is driven by the expander of the compressor/expander system when the hot gaseous working fluid is expanding, advantageously adiabatically expanding, in the expander during a discharging phase.

In some practical embodiments, turbines are used as compressor and expander. Alternatively, other types of compressors and expanders are used, for example a piston compressor and a piston expander. A shaft to the compressor is driven by the electric motor during charging, and a shaft from the expander is driving the electric generator during discharging, for storing and recovering electrical energy, respectively. Typically, the compressor and the expander are interconnected by a rotational shaft for synchronous rotational motion, and the same shaft may serve to connect to the motor and/or generator.

During charging and discharging cycles, the first TES medium, which is in the hot part of the circuit, has a temperature range higher than the second TES medium, which is in the cold part of the circuit.

In the embodiments where the first and the second TES media are sensible, the temperature of the lower end of the first TES medium is typically lower than the temperature in the upper end of the second TES medium. For example, the temperature range in the first TES medium is 50-100° C. at the lower end during discharging and 500-700° C. at the top during charging, whereas the temperature range in the second TES medium is 350-450° ° C. at the top during charging.

During charging, the second TES medium at the lower end, is maintained at temperatures where gravel has a useful specific heat capacity, for example kept at temperatures at or above 0° C.

For the latter, the TES system comprises a latent TES system, the latent TES system comprising a latent TES container that contains a latent TES medium. A latent gas flow path extends through the latent TES container for exchange of thermal energy between the gaseous working fluid and the latent TES medium during the flow of the gaseous working fluid through the latent TES container along the latent gas flow path. The latent gas flow path is part of the gas flow circuit and located between the compressor/expander system and the second TES container with respect to the flow of the gaseous working fluid.

During the charging period, the gaseous working fluid is expanded in the expander before entering the second TES container for taking up heat from the second TES medium. At the exit of the expander, the temperature of the gaseous working fluid is sub-zero, for example below −20° ° C. or even below −30° C., at which temperature, as discussed above, the specific heat capacity of gravel is low. It is therefore beneficial to increase the temperature of the gaseous working medium to a higher temperature, which is done by the latent TES medium, prior to the gaseous working fluid entering the second TES container.

The following type of latent TES system has been found useful for this purpose. In this case, the latent TES container comprises a spray nozzle, by which the latent TES medium, typically water, is sprayed as atomized liquid droplets into the latent gas flow path during the charging period and, thus, heating the gaseous working fluid by efficiently transferring thermal energy from the atomized droplets to the gaseous working fluid and cooling the droplets into ice particles. The ice particles fall downwards and accumulate as snow of the latent TES medium in the latent TES container. Although, a horizontal path of the gaseous working fluid through the latent TES container is possible, it has been found more efficient if the latent gas flow path is upwards through the spray, as the produced ice crystals fall downwards and, thus, through and against the flow of the gaseous working fluid.

Optionally, the first TES medium is a sensible TES medium, and the first gas flow path extends through this first TES medium for exchange of thermal energy between the first TES medium and the gaseous working fluid. In some of such embodiments, during the charging period, the gaseous working fluid is guided, typically through corresponding pipes, from the second TES container to the compressor and adiabatically compressed in the compressor for raising its temperature. Then, the compressed gaseous working fluid is guided into the first TES container and transfers a large proportion of thermal energy to the first TES medium. After this transfer of the thermal energy in the first TES container, the gaseous working fluid reaches the expander is adiabatically expanded in the expander to a pressure that causes the gaseous working fluid to attain a sub-zero temperature, for example a temperature in the range of −20° C. to −50° C., optionally in the range of −30° C. to −50° C. or in the range of −30° C. to −40° C.

As the gaseous working fluid with such sub-zero temperature is then flowing along the latent gas flow path through the latent TES container, it is heated due to the spraying of the latent medium into the latent gas flow path which is creating a snow of the latent TES medium in the latent TES container.

For example, after the creation of the snow, the gaseous working fluid has a temperature at or near the freezing point of the latent working fluid. However, this depends on the temperature of the liquid when sprayed into the latent TES container and the speed with which the gas flows through the container. Accordingly, the temperature of the gas can be lifted to above the freezing point.

Subsequently, the heated gaseous working fluid is guided from the latent TES container into the second TES container and along the second gas flow path through the second TES medium for transferring thermal energy from the second TES medium to the gaseous working fluid. Then, it is returned to the compressor.

The first TES container has a top and a bottom and contains its respective TES medium therein between for storing thermal energy. The second TES container has a top and a bottom and contains its respective TES medium therein between for storing thermal energy. The corresponding TES medium has an upper end and a lower end.

In some embodiments, especially where the first and second TES media are sensible TES media, the top of the first TES container and the top of the second TES container are interconnected through the compressor during charging and through the expander during discharging. The bottom of the first TES container and the bottom of the second TES container are interconnected through the compressor during discharging and through the expander during charging. The connections provide a gas flow circuit for the gaseous working fluid in one way through the TES containers during charging and in the opposite way during discharging.

In operation, during a charging period, the tops of the first and second TES containers are connected through the compressor, and the bottoms are connected through the expander. When driving the compressor/expander system by the electric motor, the gaseous working fluid from the top of the second TES container is received by the compressor and adiabatically compressed for increasing the temperature of the gaseous working fluid. For example, the compressor is raising the temperature of the gaseous working fluid during the charging to a temperature above 400° C., optionally to a temperature in the range of 400° C. to 700° C., for example in the range of 550° C. to 650° C. As the gaseous working fluid is taken from the top of the second TES container and the temperature raised further by the compressor, the temperature downstream of the compressor is always higher than the temperature in the second TES container during charging.

The hot gaseous working fluid from the compressor is provided into the top of the first TES container and transfers heat to the first TES medium during its way downwards from the top to the bottom of the first TES container through the first TES medium. After that, the gaseous working fluid is received by the expander and adiabatically expanded, which decreases the temperature of the gaseous working fluid prior to its way through the latent TES container where thermal energy is received from the spray of the latent working fluid. Subsequently, the gaseous working fluid is supplied to the bottom of the second TES container and makes its way from the bottom to the top through the second TES medium where it takes up thermal energy from the second TES medium.

During the transfer of thermal energy from the spray of the latent TES medium to the gaseous working fluid, the flow of the gaseous working fluid and the amount of spray are adjusted so that the gaseous working fluid attains a temperature of the freezing temperature, or even adjusted to above the freezing point if the temperature of the spray is above the freezing point. This way, the latent TES medium sets a lower limit of the gas temperature when supplied to the second TES medium.

For example, the temperature $T_0$ of the latent working fluid is in the range of between 0° C. and 20° C. This is a good starting temperature for uptake of heat from the gravel in the second TES container. As discussed above, due to the specific heat capacity of the gravel decreasing with decreasing temperature, its TES capabilities are decreasing at lower temperature, so that the temperature of the second TES medium should not be decreased below 0° C.

For example, during charging, the latent TES system raises the temperature of the gaseous working fluid from the expander, which leaves the expander with a gas temperature $T_e$, by at least 25° C. For example, the gaseous working fluid at the exit of the expander has a temperature $T_e$ in the range of −25° C. to −45° C., such as in the range of −30° C. to −40° C., and is then heated to a temperature $T_0$ in the temperature range of 0° ° C. to 20° C., for example to 0° C., in the latent TES container, before it is supplied to the bottom of the second TES container.

During a discharging period, the flow direction in the gas flow of the gas flow circuit is reversed. For example, the tops of the first and second TES containers are connected through the expander and the bottoms through the compressor. The gaseous working fluid from the top of the first TES container is received by the expander and drives the expander as well as the generator during adiabatic expansion of the hot gaseous working fluid towards the low temperature section of the circuit. The gaseous working fluid from the expander is guided into the top of the second TES container and through the second TES medium for transferring thermal energy from the gaseous working fluid to the second TES medium during its way from the top to the bottom of the second TES container.

Optionally, the gaseous working fluid also traverses the latent TES system for transfer of thermal energy to the latent working fluid on its way from the bottom of the second TES container to the compressor during the discharging period. For such case, the latent TES system comprises a gas cooling path as part of the gas flow circuit during the discharging period. The gas cooling path is provided in gas flow direction between the second TES container and the compressor for cooling the gaseous working fluid prior to entering the compressor. The flow of the gaseous working fluid along the gas cooling path is only established during the discharging period, where the latent TES medium is not sprayed as liquid into the gas flow. Instead, a snow injector is provided for injecting the earlier produced snow into the gaseous working fluid in the gas cooling path. This cools the gaseous working fluid as the gaseous working fluid is melting the snow prior to entering the compressor.

As an option, the latent TES container contains the spray nozzle, and a further latent TES container contains the snow injector. Alternatively, the latent TES container contains the latent gas flow path with the spray nozzle as well as the gas cooling path with the snow injector. During the charging period, liquid is injected for producing snow, and during the discharging period, snow is provided that was produced during the charging period and injected by the snow injector into the gaseous working fluid inside the latent TES container.

Irrespective of the gaseous working fluid being precooled by the latent TES system during discharging or not, the gaseous working fluid from the second TES container is received by the compressor and adiabatically compressed, which increases the temperature of the gas. The compressed gaseous working fluid is received at the bottom of the first TES container for transfer of further thermal energy from the first thermal medium to the gaseous working fluid during its flow towards the top of the first TES container, which completes the discharge cycle.

The pressure in the first TES container and in the pipe system above the compressor/expander system is higher than the pressure in the second TES container and in the pipe system below the compressor/expander system. Accordingly, the region of the thermodynamic circuit above the compressor/expander is a high pressure region, and the region of the thermodynamic circuit below the compressor/expander system is a low pressure region.

The section between the tops of the TES containers has a temperature higher than the section between the bottoms of the TES containers, which is why the section between the tops of the TES containers is called a high temperature section of the thermodynamic circuit, and the section between the bottoms of the TES containers is called a low temperature section of the thermodynamic circuit.

The latent TES system can be established as an add-on to existing thermodynamic circuits for improving the efficacy in two ways. On the one hand, the improvement is achieved by counteracting detrimental flattening of the gradient in the TES container. On the other hand, it sets a lower limit for the gas temperature when supplied to the cold second TES medium during charging, avoiding the low-temperature regime in which the specific heat capacity of the second TES medium is low. The latter is important, as the use of a temperature range where the specific heat capacity of the second TES medium is high allows minimization of the amount of the second TES medium in the second TES container. This, in turn, reduces costs, seeing that large proportions of construction costs are used for the containers.

In experiments, providing the exchange of thermal energy between the gaseous working fluid and the latent working fluid only by heat exchange in the flow circuit between the energy converter and the bottom of the second TES container has been proven sufficient for high efficiency. Accordingly, in some embodiments, such latent TES system is the only latent TES system in thermal connection with the thermodynamic gas circuit.

Due to the increase of efficiency by such simple latent add-on system, the TES containers can be kept free from latent heat storage and only contain sensible TES media.

However, it may be useful to provide a further heat exchanger in the gas flow circuit between the bottom of the first TES container and the compressor/expander system. In some further embodiments, the further heat exchanger exchanges thermal energy between the gaseous working fluid and a fluid flowing through the further heat exchanger for changing the temperature in the fluid. For example, heat is provided to such fluid, optionally water, for heating purposes, such as in a heat distribution network for dwellings.

SHORT DESCRIPTION OF THE DRAWINGS

The invention will be explained in more detail with reference to the drawings, where.

DETAILED DESCRIPTION

Figure 1A:
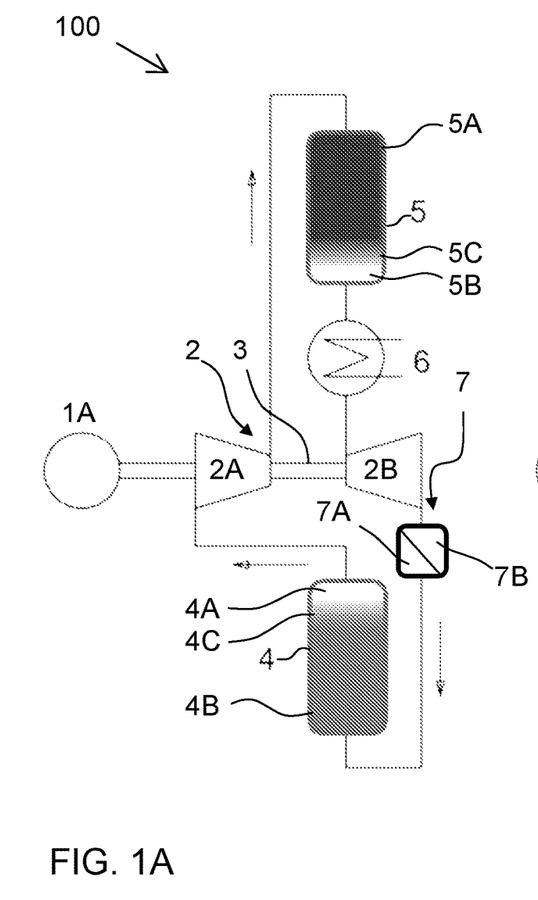
FIG. 1 illustrates a principal sketch of an energy storage system in A) charging cycle and B) discharging cycle.
Figure 1B:
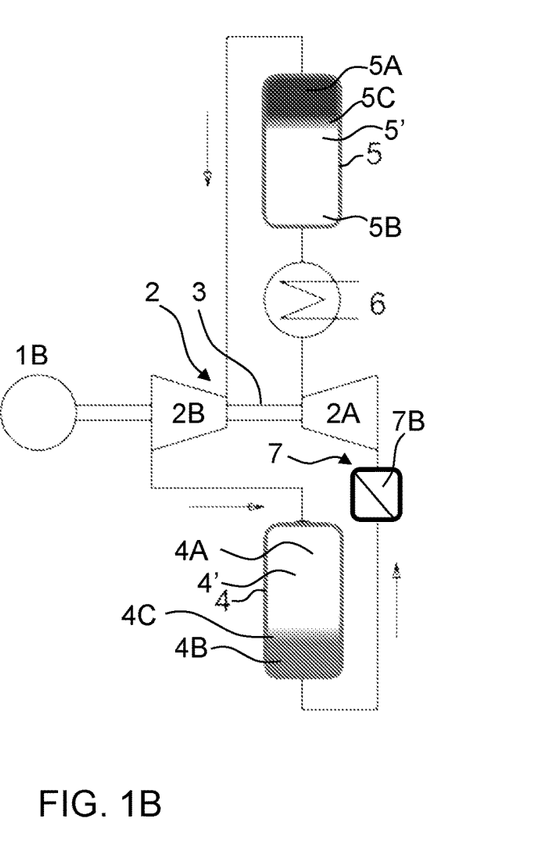

FIG. 1A illustrates a principal sketch of a thermal energy storage (TES) system 100 during a charging cycle, and FIG. 1B is a corresponding discharging cycle.

The system 100 comprises an electrical motor/generator system with an electrical motor 1A and an electrical generator 1B, shaft-connected to a compressor/expander system 2 with a compressor 2A and an expander 2B, connected by a common rotational shaft 3, for example a co-functional compressor/expander unit.

The system 100 also comprises a first thermal energy storage (TES) container 5 containing a first gas-permeable TES medium 5', and a second TES container 4 containing a second gas-permeable TES medium 4'. For example, the medium is gravel.

The working fluid is gaseous throughout the circuit.

With reference to FIG. 1A, during charging, the motor 1A drives the compressor 2A for compressing the gaseous working fluid by the compressor 2A, where the gaseous working fluid is taken from the top of the second TES container 4. The temperature of the gaseous working fluid from the second TES container increases adiabatically by the compression in the compressor 2A, and the hot gaseous working fluid from the exit of the compressor 2A is added to the top of the inner volume of the first TES container 5 for heating the first TES medium 5', for example gravel, inside the first TES container 5.

While the compressed gaseous working fluid flows through the first TES medium 5' from top to bottom in the first TES container 5, it heats up the contained first TES medium 5', first in the top and subsequently further down. During the charging, the size of the hot-temperature volume 5A of the first TES medium 5' that has already attained the temperature of the compressed gaseous working fluid increases gradually with time, so that the heated hot-temperature volume 5A expands downwards in the first TES container 5 by which the low-temperature volume 5B of the first TES medium 5' correspondingly decreases.

For example, the temperature of the compressed gaseous working fluid is in the range of 500° C. to 700° C., which will be the temperature at the top of the first TES container 5 at the start of the charging. While the gaseous working fluid traverses the first TES container 5 it is cooled by thermal transfer to the first TES medium 5' inside the first TES container 5 and leaves the bottom of the first TES container at a lower temperature, for example in the range of 50-100° C. during the start of the charging period. It expands in the expander 2B, which cools the gaseous working fluid further down, for example to a temperature $T_e$ in the range of −25° C. to −45° C.

After the expander 2B, the gaseous working fluid enters the bottom of the second TES container 4 and passes through the second TES medium 4' in the second TES container 4 on its way from the bottom to the top, so that it gets heated, for example to a temperature in the range of 350° C. to 450° ° C., after which it enters the circuit again. The low-temperature volume 4B of the second TES medium 4' increases during this process, while the high-temperature volume 4A in the second TES container 4 decreases correspondingly during the charging process.

Between the high-temperature volume 5A and the low-temperature volume 5B in the first TES container 5, the temperature transition region 5C with the temperature gradient from the high to the low temperature is called the thermocline zone. Similarly, the transition region with the thermocline zone 4C between the high-temperature volume 4A and the low-temperature volume 4B of the second TES medium 4' in the second TES container 4 is called a thermocline zone. These transition regions or thermocline zones 4C, 5C are desired narrow with a steep gradient.

As a measure for improving the efficiency, a heat exchanger 6 is provided in order to transfer heat to an external fluid. For example, the heat received by the heat exchanger 6 is used for heating dwellings. It may also be stored for later return to the circuit.

The charging process is done when surplus electricity is available in the electricity system, for example from a solar power plant or wind turbines or from a more conventional electricity production plant using fossil fuel. The electricity drives the motor 1A for the compressor/expander 2 during the charging process.

The pressure in the first TES container 5 and in the pipe system above the compressor/expander system 2 is higher than the pressure in the second TES container 4 and in the pipe system below the compressor/expander 2. Accordingly, the region of the thermodynamic circuit above the compressor/expander 2 is a high pressure region, and the region of the thermodynamic circuit below the compressor/expander 2 is a low pressure region. The section between the tops of the TES containers 4, 5 has a temperature higher than the section between the bottoms of the TES containers, which is why the section between the tops of the TES containers is called a high temperature section of the thermodynamic circuit, and the section between the bottoms of the TES containers is called a low temperature section of the thermodynamic circuit.

Once, the charging process has been finished, the thermal energy is stored until a demand for electricity is present, and discharging starts with a gas flow in the opposite direction. During discharging, the hot gaseous working fluid from the first TES container 5A is leaving the container 5 at the top and is adiabatically expanding in the expander 2B towards the low-pressure in the second TES container 4. The expander 2B drives the generator 1B to produce electricity, for example for giving it back to the electricity grid for general consumption. The expansion of the hot gaseous working fluid in the expander 2B leads to cooling of the gas. The cooled gaseous working fluid is then supplied to the top of the second TES container 4 in which it is further cooled by thermal transfer to the second TES medium 4' on its way to the bottom. The cold gaseous working fluid leaves the second TES container 4 at the bottom and is, after compression in the compressor 2A and corresponding increase of temperature, added to the bottom of the first TES container 5 where it is heated up by the first TES medium 5' during its flow from the bottom to the top of the first TES container 5.

Notice that the gas as working fluid is not undergoing a phase shift into liquid in this circuit.

This just described circuit suffers from some shortcomings if it is provided without a latent TES system 7, which is described in more detail in the following. These shortcomings are as follows. Firstly, as already discussed, the temperature gradient is advantageously maintained steep in the transition regions 4C and 5C, which contain the thermocline. However, as discussed in the introduction, it is a common risk that the thermocline degrades during the charge and discharge, especially during repeated cycles. When the thermocline zones 4C, 5C move through the respective containers 4, 5, the thermocline tends to flatten. Secondly, as mentioned above, although gravel is a useful material for large-scale heat storage facilities due to its low cost, gravel has the disadvantageous property of the specific heat capacity decreasing with decreasing temperature. Accordingly, heat exchange at very low temperatures, for example at a temperature $T_e$ of $-35°$ C., is not optimum due to the decreased heat capacity. Due to the heat capacity decreasing with temperature, the second TES container 4 would need more gravel relative to the first TES container 5 in order to create a thermal storage balance between the two containers in the circuit.

In order to optimize the system with respect to thermocline control and with respect to reduction of the content of gravel in the second TES container 4, the following technical solution has been found very useful.

In this technical solution, a latent TES system 7 is provided in the gas flow path between the compressor/expander system 2 and the bottom of the second TES container 4. The latent TES system 7 comprises a latent charging stage 7A and a latent discharging stage 7B. Although, these stages 7A, 7B are illustrated as being combined, this needs not to be the case, as the gaseous working fluid may be directed with corresponding pipes into the latent charging stage 7A in the charging period and with other pipes into the latent discharging stage 7B during the discharging period.

Figure 2:
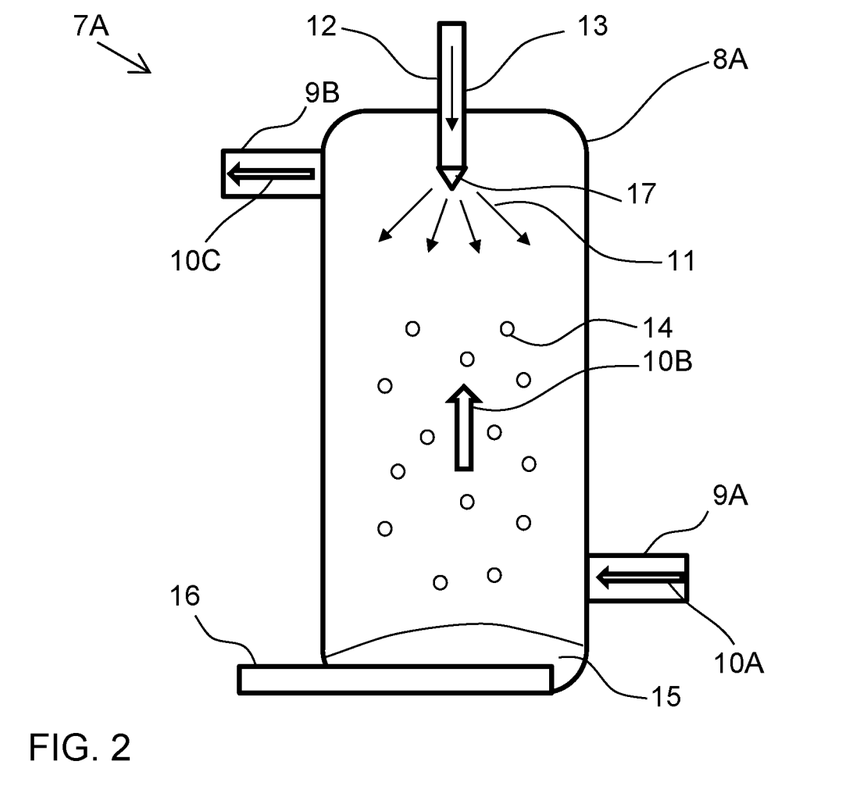
FIG. 2 illustrates the spray function of the latent TES system.

FIG. 2 is a sketch of an exemplified latent charging stage 7A. It comprises a latent TES container 8A into which, during the charging period, the gaseous working fluid from the expander 2B enters through a lower gas conduit 9A, which is shown by arrow 10A. The gaseous working fluid moves upwards through the latent TES container 8A, which is indicated by arrow 10B and leaves the latent TES container 8A through an upper gas conduit 9B, which is indicated by arrow 10C, for flow to the second TES container 4. During the flow of the gaseous working fluid through the latent TES container 8A, the gaseous working fluid meets a spray 11 of latent TES medium. The latent TES medium, typically water, has been provided as liquid flowing through tube 12, as indicated by arrow 13, and formed into a liquid spray 11 of atomized droplets 14 by a spray nozzle 17. Due to the temperature of the gaseous working fluid being lower than the freezing temperature of the latent TES medium, the droplets 14 are freezing into miniscule ice particles, which accumulate as snow 15 at the bottom of the TES container 8A. The snow 15 can be taken out by a conveyor 16 and stored for later use, in particular for use during the discharging period. The transfer of thermal energy from the latent TES medium to the gaseous working fluid is highly efficient as the droplets 14 have a large surface as compared to their volume and there is direct contact between the latent TES medium and the gaseous working fluid.

Figure 3:
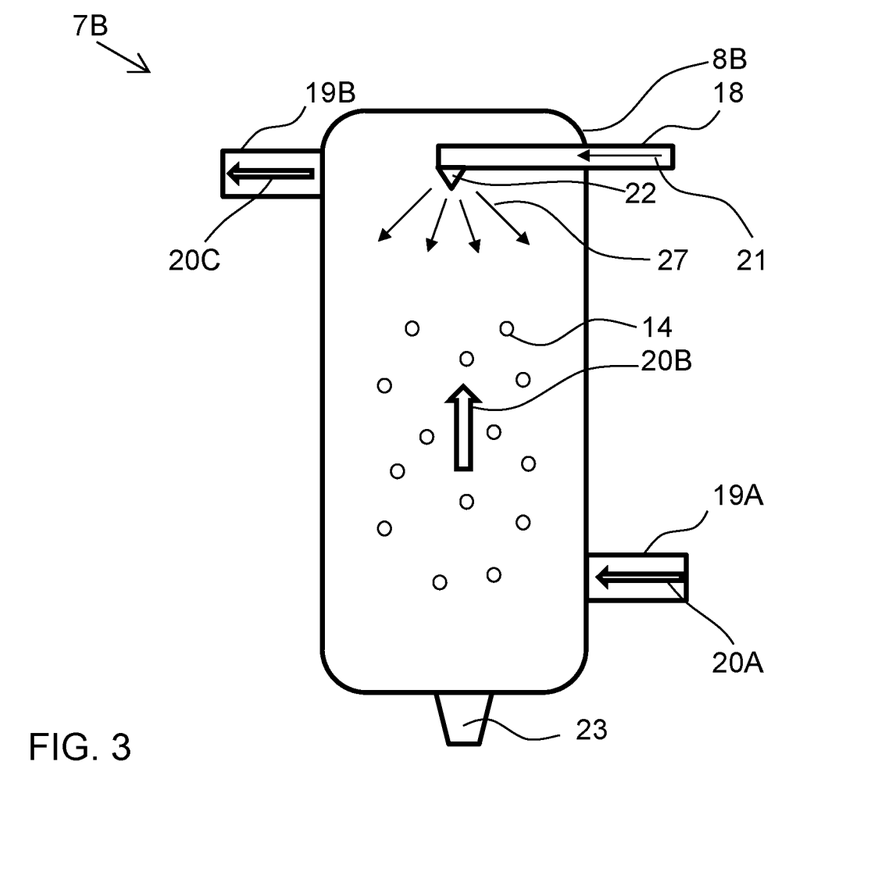
FIG. 3 illustrates the snow injector of the latent TES system.

FIG. 3 is a sketch of an exemplified latent discharging stage 7B. It comprises a further latent TES container 8B into which, during the discharging period, the gaseous working fluid from the second TES 4 container enters through a lower gas conduit 19A, which is shown by arrow 20A. The gaseous working fluid moves upwards through the further latent TES container 8B, which is indicated by arrow 20B and leaves the further latent TES container 8B through an upper gas conduit 19B, which is indicated by arrow 20C. During the flow of the gaseous working fluid through the further latent TES container 8B, the gaseous working fluid meets a powder front 27 of ice particles of the latent TES medium. The ice powder of latent TES medium, typically water ice, has been provided as snow, possibly compacted snow, transported by conveyor 18, as indicated by arrow 21. In order to provide the compacted snow as fine powder, a snow grinder 22 is advantageously provided. Due to the temperature of the gaseous working fluid being higher than the freezing temperature of the latent TES medium, the snow particles are melting into miniscule droplets 14, which accumulate at the bottom of the further latent TES container 8B and are drained at the bottom through liquid drain 23. The transfer of thermal energy from the gaseous working fluid to the snow of the latent TES medium is highly efficient as the snow particles have a large surface as compared to their volume and there is direct contact between the latent TES medium and the gaseous working fluid.

The latent TES container 8A and the further latent TES container 8B are optionally provided side by side. It is also possible to integrate the two functions in a single container and connect the inlet and outlet for the gaseous working medium by pipes and valves as is customary in the technical field.

Importantly, the specific heat capacity of the gravel is kept relatively high due to the latent charging stage 7A raising the temperature of the gaseous working fluid prior to entering the second TES container 4 during the charging phase. This, in turn, implies that the amount of gravel can be kept much smaller than in a comparative system where the temperature in the cold storage tank is far below $0°$ C. As an example that was mentioned above, the gas temperature downstream of the expander during charging may be as low as −35° C., where the specific heat capacity of gravel is very low.

The addition of a latent TES system 7 is useful in that it can be provided as an add-on feature during retrofit of already existing systems. As the PCM is not added inside any of the sensible TES containers 4, 5, such add-on is very simple, only requiring an insertion in the flow path or connection to the flow path between the compressor/expander system 2.

If the TES system is also provided with a discharging latent stage 7B, the gaseous working fluid that flows from the lower end of the second TES container 4 in the discharging period will have its temperature decreased by transfer of thermal energy from the gaseous working fluid to the latent TES medium.

Also, this system improves the efficiency by counteracting flattening of the gradient in the TES container and sets a lower limit for the gas temperature when supplied to the cold second TES medium, avoiding the low-temperature regime in which the specific heat capacity of the second TES medium is low.

Figure 4:
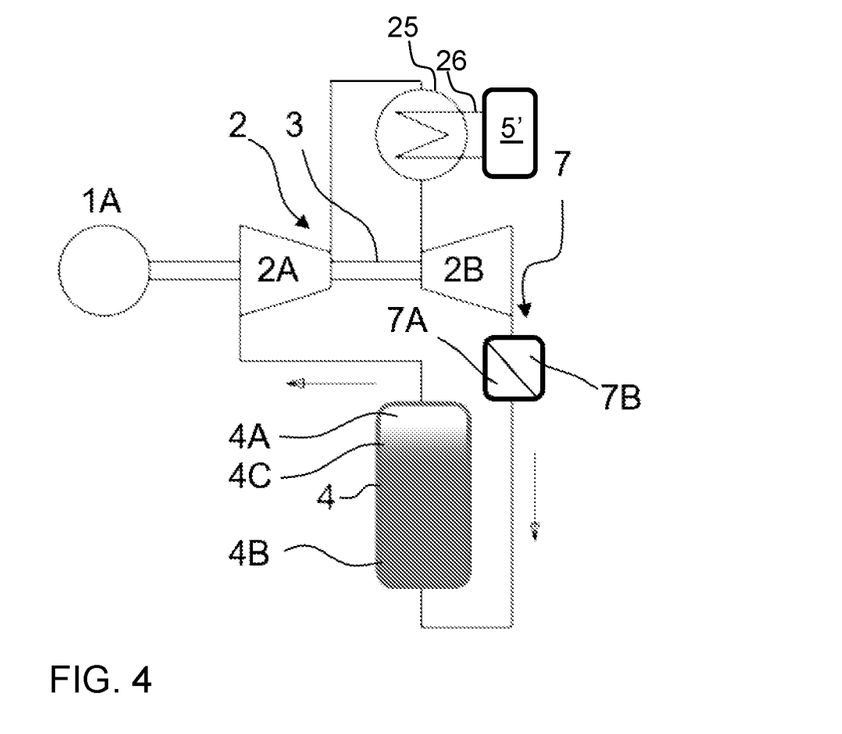
FIG. 4 illustrates an alternative embodiment of an energy storage system.

FIG. 4 illustrates a further embodiment, in which the first TES medium 5', sensible or latent or a combination thereof, is thermally connected to the gas flow circuit through a heat exchanger 25. Thermal energy is transferred between the gas flow circuit and the first TES medium by a thermal transfer circuit 26.

The invention claimed is:

1. A method of operating a thermal energy storage, TES, system, wherein the TES system comprises,
   a thermodynamic gas flow circuit containing a working fluid that is not in liquid phase but maintained in gas phase throughout the gas flow circuit;
   a first TES container containing a first TES medium as a hot storage medium, wherein the first TES medium is in thermal connection with the gas flow circuit along a first gas flow path for exchange of thermal energy with the gaseous working fluid, wherein the first gas flow path is part of the gas flow circuit;
   a second TES container containing a second TES medium as a sensible cold storage medium for storing thermal energy and a second gas flow path through the second TES medium for exchange of thermal energy between the gaseous working fluid and the second TES medium, wherein the second gas flow path is part of the gas flow circuit;
   an energy converter for converting between electrical energy and thermal energy of the gaseous working fluid in the gas flow circuit; the energy converter comprising an electrical motor, an electrical generator, and a compressor/expander system, the compressor/expander system comprising a compressor and an expander, wherein the compressor is functionally connected to the motor for being driven by the motor during a charging period, and the expander is functionally connected to the generator for driving the generator during a discharging period;
   wherein the method comprises during a charging period, driving the compressor by the motor and adiabatically compressing the gaseous working fluid by the compressor, and circulating the gaseous working fluid through the gas flow circuit from the compressor through the first gas flow path, then through the expander, and then through the second gas flow path, and back to the compressor;
   wherein the TES system comprises a latent TES system, the latent TES system comprising a latent TES container that contains a latent TES medium,
   wherein a latent gas flow path extends through the latent TES container for exchange of thermal energy between the gaseous working fluid and the latent TES medium during the flow of the gaseous working fluid through the latent TES container along the latent gas flow path, wherein the latent gas flow path is part of the gas flow circuit and located between the compressor/expander system and the second TES container with respect to flow of the gaseous working fluid;
   wherein the latent TES container comprises a spray nozzle arranged for spraying the latent TES medium as atomized liquid droplets into the latent gas flow path;
   wherein the method comprises spraying the latent TES medium as atomized liquid droplets into the latent gas flow path during the charging period and heating the gaseous working fluid by transferring thermal energy from the atomized droplets to the gaseous working fluid and cooling the droplets into ice particles so as to provide a snow of the latent TES medium in the latent TES container.

2. The method according to claim 1, further comprising directing the latent gas flow path upwards through the spray.

3. The method according to claim 1, wherein the latent TES medium is water, and wherein the method comprises spraying liquid water into the latent gas flow path.

4. The method according to claim 1, wherein the first TES medium is a sensible TES medium, and the first gas flow path extends through the first TES medium for exchange of thermal energy between the first TES medium and the gaseous working fluid; wherein the method in the charging period comprises,
   guiding the gaseous working fluid from the second TES container to the compressor and adiabatically compressing the gaseous working fluid by the compressor for raising its temperature;
   guiding the compressed gaseous working fluid into the first TES container and transferring thermal energy from the gaseous working fluid to the first TES medium;
   after transfer of the thermal energy in the first TES container, guiding the gaseous working fluid to the expander and adiabatically expanding the gaseous working fluid by the expander to a pressure that causes the gaseous working fluid to attain a sub-zero temperature;
   guiding the gaseous working fluid with sub-zero temperature along the latent gas flow path through the latent TES container and spraying the latent medium as droplets into the latent gas flow path and freezing the droplets for heating the gaseous working fluid by the creation of snow;
   guiding the heated gaseous working fluid from the latent TES container into the second TES container and along the second gas flow path through the second TES medium and transferring thermal energy from the second TES medium to the gaseous working fluid.

5. The method according to claim 1,
   wherein the first TES container has a top and a bottom, and the first TES medium has an upper end and a lower end between the top and bottom of the first TES container, wherein the second TES container has a top and a bottom, and the second TES medium has an upper end and a lower end between the top and bottom of the second TES container, wherein the method comprises during a charging period:

interconnecting the tops of the first and second TES containers through the compressor and the bottoms of the first and second TES containers through the expander, receiving the gaseous working fluid from the top of the second TES container by the compressor for the adiabatic compression, providing the compressed gaseous working fluid into the top of the first TES container and guiding it along the first flow path downwards from the top to the bottom of the first TES container through the first TES medium, receiving the gaseous working fluid from the bottom of the first TES container by the expander for the adiabatic expansion;

guiding the gaseous working fluid from the expander through the latent TES container;

receiving the gaseous working fluid by the bottom of the second TES container, and guiding it along the second flow path through the second TES medium, and by flow through the second TES medium towards the top of the second TES container prior to supplying it to the compressor again.

6. The method according to claim 1, wherein the method comprises providing the first TES container and the second TES container to only contain sensible TES media for thermal energy storage and no latent TES media for thermal energy storage, and wherein the method comprises storing thermal energy from the working fluid in the sensible TES media and keeping the TES containers free from latent heat storage.

7. The method according to claim 1, further comprising raising the temperature of the gaseous working fluid by the compressor during the charging to a temperature above 400° C.

8. The method according to claim 1, wherein the first TES medium or the second TES medium or both are gas permeable and the method comprises creating a flow of the gaseous working fluid through the first or the second TES medium or both, respectively, with direct contact between the gaseous working fluid and the first or the second TES medium or both.

9. The method according to claim 1, wherein the TES system comprises a gas cooling path as part of the gas flow circuit during the discharging period only, the gas cooling path being provided in gas flow direction between the second TES container and the compressor for cooling the gaseous working fluid prior to entering the compressor; wherein a snow injector is provided for injecting snow into the gaseous working fluid in the gas cooling path; wherein the method comprises, only in the discharging period, injecting snow into the gaseous working fluid while it flows through the gas cooling path and cooling the gaseous working fluid by the gaseous working fluid melting the snow prior to entering the compressor.

10. The method according to claim 9, wherein the method comprises, during the discharging period, providing snow that was produced during the charging period to the snow injector.

11. A thermal energy storage, TES, system comprising:
a thermodynamic gas flow circuit containing a working fluid that is not in liquid phase but maintained in gas phase throughout the gas flow circuit;
a first TES container containing a first TES medium as a hot storage medium, wherein the first TES medium is in thermal connection with the gas flow circuit along a first gas flow path for exchange of thermal energy with the gaseous working fluid, wherein the first gas flow path is part of the gas flow circuit;
a second TES container containing a second TES medium as a sensible cold storage medium for storing thermal energy and a second gas flow path through the second TES medium for exchange of thermal energy between the gaseous working fluid and the second TES medium, wherein the second gas flow path is part of the gas flow circuit;
an energy converter for converting between electrical energy and thermal energy of the gaseous working fluid in the gas flow circuit; the energy converter comprising an electrical motor, an electrical generator, and a compressor/expander system, the compressor/expander system comprising a compressor and an expander, wherein the compressor is functionally connected to the motor for being driven by the motor during a charging period, and the expander is functionally connected to the generator for driving the generator during a discharging period;
wherein the system is configured for driving the compressor by the motor during the charging period and adiabatically compressing the gaseous working fluid by the compressor, and circulating the gaseous working fluid through the gas flow circuit from the compressor through the first gas flow path, then through the expander, and then through the second gas flow path, and back to the compressor;
wherein the TES system comprises a latent TES system, the latent TES system comprising a latent TES container that contains a latent TES medium,
wherein a latent gas flow path extends through the latent TES container for exchange of thermal energy between the gaseous working fluid and the latent TES medium during the flow of the gaseous working fluid through the latent TES container along the latent gas flow path, wherein the latent gas flow path is part of the gas flow circuit and located between the compressor/expander system and the second TES container with respect to flow of the gaseous working fluid; wherein the latent TES container comprises a spray nozzle arranged for spraying the latent TES medium as atomized liquid droplets into the latent gas flow path during the charging period for heating the gaseous working fluid by transferring thermal energy from the atomized droplets to the gaseous working fluid and cooling the droplets into ice particles so as to provide a snow of the latent TES medium in the latent TES container.

* * * * *